C. A. Shaw,
Gas Cock,
Nº 41,644.   Patented Feb. 16, 1864.

Witnesses:
Geo. H. Adams
Albert Perkins

Inventor:
Charles A. Shaw

UNITED STATES PATENT OFFICE.

CHARLES A. SHAW, OF BIDDEFORD, MAINE.

IMPROVEMENT IN GAS-FIXTURES.

Specification forming part of Letters Patent No. 41,644, dated February 16, 1864.

*To all whom it may concern:*

Be it known that I, CHARLES A. SHAW, of Biddeford, in the county of York and State of Maine, have invented a new and useful Improvement in Gas-Fixtures; and I hereby declare that the following is a full, clear, and exact description of the same, reference being had to the accompanying drawings, forming part of this specification, in which drawings—

Figure 1:
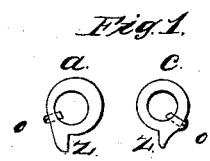
Figure 2:
Figure 3:
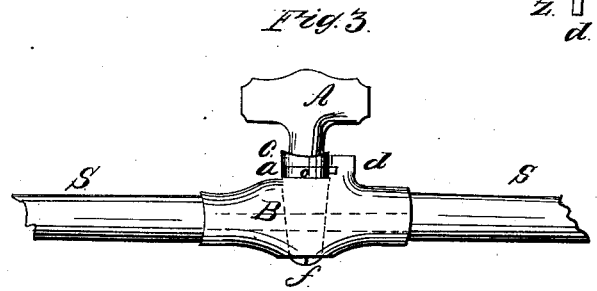

Figure 1 is a view of the rings shown separately. Fig. 2 is a view of the rings shown in the position they occupy when placed on the plug. Fig. 3 is a perspective view showing my improved gas cock or faucet complete.

Corresponding letters refer to corresponding parts.

The nature of my invention will be seen by the following description.

Fig. 3 shows sections of gas-pipe $s\ s$, connected by a stop-cock connector, B, having a plug or valve, A, which is kept in its place by a screw, $f$, in the usual manner. Around the plug or valve A, I place two rings, $a\ c$, Fig. 1, having the projections or shoulders $z\ z$ and set screws $o\ o$ for fastening them in any required position. These rings are slipped onto the plug before it is put into the body or connector B, so that when the plug is fastened by the screw $f$ the rings occupy the position shown in Fig. 3. A stationary dog or hub, $d$, is cast on or connected with the body of the cock R in such a manner that after the rings $a\ c$ are in place they cannot be turned or revolved entirely around the plug A, on account of the shoulders $z\ z$ coming in contact with the hub or stop $d$. Before being slipped onto the plug the rings are placed in the position shown in Fig. 2, so that the straight side or face of the shoulder $z$ on the ring $c$ shall come on one side of the hub or dog $d$, and the straight side of the shoulder $z$ on the ring $a$ shall come on the other side of the hub, as shown in the drawings.

The opperation of my improved gas cock or faucet will be understood by the following: When a certain ascertained or desired amount of light only is required, the plug or valve A, Fig. 3, is turned until a sufficient amount of gas escapes to produce such light. One of the rings, $a$ or $c$, is then turned on the plug A until its straight shoulder comes in contact with the stop or dog $d$, in which position it is fastened by its screw $o$. The plug A is then turned in the opposite direction until the same quantity of gas is discharged or the same amount of light is produced as was produced when it was in the position occupied at the time the first ring was fastened to it. The second or other ring is then moved or turned around until its straight shoulder comes in contact with the hub or stop $d$, in which position it also is firmly fastened to the plug by turning in its set-screw $o$. It will now be seen that, both rings $a\ c$ being fastened to the plug A, if the plug is turned in either direction as far as possible no more than the proper amount of gas can escape, on account of the plug being stopped at the right time in its revolution by coming in contact by its rings with the stop $d$.

It is well known to all consumers of gas that in "lighting up" when the gas is turned on it is very difficult to turn the plug or valve of the common gas-cock exactly far enough to let on precisely the right quantity of gas, so that a large amount generally "blows off" unconsumed before the valve can be adjusted, and, where burners are used which have a glass chimney, is very likely to break the chimney by the large flame. This difficulty is more especially noticeable in public halls or large rooms, where the burners are so situated that the person lighting up the gas cannot reach them without the aid of a staff or pole made for that purpose. In such cases it is not unusual for such persons to be several minutes adjusting the valve or plug to let on the proper amount of gas.

In hotels and many other places it is necessary, as is well known, to supply many of the burners with the minimum quantity of gas which they will consume for a long period; but where common gas-fixtures are used, and the matter is left to the care and discretion of servants, no regularity or economy can be attained. In some gas-fixtures a stationary pin is used, projecting from the plug A, and so arranged that it comes in contact with a stop or dog on the side of the body or connector B to indicate when the plug A is turned precisely at right angles to the connector or pipes $s\ s$, and the gas is securely shut off. Where such a pin is used, but one of the rings, $a$ or $c$, is required, as the plug cannot in such a case be revolved or turned entirely around. Where a pin is used, as described, to tell when the gas is properly shut off, and in combination therewith one of my adjustable rings is used, as shown, to regulate the flow of the gas, greater regularity, economy, and safety are attained than in any other manner.

My improvement can also be used to good advantage in the construction of faucets for discharging liquids where they require to be gaged to discharge a given quantity. A pin projecting from the plug and arranged to strike a stop in such a manner as to show when the gas is securely shut off, but which pin is not adjustable, is old and an invention of a different nature from mine, and I therefore do not claim such an arrangement; but What is new and of my invention is—

An adjustable ring or rings, or an equivalent, in combination with the plug A and connector B, substantially in the manner and for the purposes set forth and specified, and this I claim whether the said plug has a pin arranged in the manner described or not.

CHARLES A. SHAW.

Witnesses:
GEO. H. ADAMS,
ALBERT PERKINS.